(12) United States Patent
Obana et al.

(10) Patent No.: US 11,330,157 B2
(45) Date of Patent: May 10, 2022

(54) IMAGE PICKUP APPARATUS COMPRISING DRIVEN BODY DRIVEN BY ACTUATOR, AND MOVING BODY

(71) Applicant: CANON KABUSHIKI KAISHA, Tokyo (JP)

(72) Inventors: Shinji Obana, Kunitachi (JP); Ayumu Nemoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/995,722

(22) Filed: Jun. 1, 2018

(65) Prior Publication Data

US 2018/0352124 A1 Dec. 6, 2018

(30) Foreign Application Priority Data

Jun. 2, 2017 (JP) .............................. JP2017-110103

(51) Int. Cl.
*H04N 5/225* (2006.01)
*H02N 2/00* (2006.01)
(Continued)

(52) U.S. Cl.
CPC ........... *H04N 5/2253* (2013.01); *B64C 25/10* (2013.01); *F16M 11/38* (2013.01); *G03B 15/006* (2013.01);
(Continued)

(58) Field of Classification Search
CPC .. H04N 5/2253; H04N 5/2252; H04N 5/2254; H04N 5/2257; H04N 5/23203;
(Continued)

(56) References Cited

U.S. PATENT DOCUMENTS 7,466,062 B2 12/2008 Sakatani
7,812,507 B2 10/2010 Takahashi et al.
(Continued)

FOREIGN PATENT DOCUMENTS

CN 1780134 A 5/2006
CN 205602149 U 9/2016
(Continued)

OTHER PUBLICATIONS

Extended European Search Report issued in European Appln. No. 18174711.4 dated Nov. 6, 2018.
(Continued)

*Primary Examiner* — Sinh Tran
*Assistant Examiner* — Zhenzhen Wu
(74) *Attorney, Agent, or Firm* — Rossi, Kimms & McDowell LLP

(57) ABSTRACT

An image pickup apparatus is capable of decreasing a space capacity occupied by component elements and being downsized compared to a case where an actuator is arranged independently of a supporting unit. The image pickup apparatus has an image pickup unit driven by the actuator, a base unit, and the supporting unit provided in a standing manner from the base unit and rotatably supports the image pickup unit. The actuator has a piezoelectric element and an oscillator including a transmission unit which transmits driving force caused by vibration excited by the piezoelectric element. The transmission unit is arranged in the supporting unit so that it is in pressure contact with the image pickup unit. The image pickup unit has a transmitted plane with which the transmission unit is brought into pressure contact, and the vibration excited by the oscillator causes the transmitted plane to move relatively to the oscillator.

32 Claims, 12 Drawing Sheets

(51) Int. Cl.
  *G03B 15/00* (2021.01)
  *G03B 17/56* (2021.01)
  *H02N 2/10* (2006.01)
  *B64C 25/10* (2006.01)
  *F16M 11/38* (2006.01)
  *H04N 5/232* (2006.01)
  *H04N 7/18* (2006.01)
  *G01C 21/18* (2006.01)

(52) U.S. Cl.
  CPC ........... *G03B 17/561* (2013.01); *H02N 2/001* (2013.01); *H02N 2/0055* (2013.01); *H02N 2/0085* (2013.01); *H02N 2/103* (2013.01); *H04N 5/2252* (2013.01); *H04N 5/2254* (2013.01); *H04N 5/2257* (2013.01); *H04N 5/23203* (2013.01); *H04N 5/23248* (2013.01); *H04N 7/185* (2013.01); *G01C 21/18* (2013.01)

(58) Field of Classification Search
  CPC .... H04N 5/23248; H04N 7/185; B64C 25/10; F16M 11/38; G03B 17/561; H02N 2/001; H02N 2/0055; H02N 2/0085; H02N 2/103
  See application file for complete search history.

(56) References Cited

U.S. PATENT DOCUMENTS

| | | | |
|---|---|---|---|
| 2001/0055487 A1 | 12/2001 | Akada | |
| 2006/0113868 A1* | 6/2006 | Sakatani | H01L 41/0913 310/323.17 |
| 2006/0133786 A1* | 6/2006 | Teramoto | H04N 5/2253 396/55 |
| 2009/0039734 A1* | 2/2009 | Takahashi | H02N 2/0025 310/323.02 |
| 2009/0148151 A1* | 6/2009 | Shi | G03B 17/561 396/428 |
| 2009/0257139 A1* | 10/2009 | Shiga | G02B 7/023 359/824 |
| 2010/0051774 A1 | 3/2010 | Shi et al. | |
| 2011/0234041 A1* | 9/2011 | Kanazawa | H02N 2/006 310/300 |
| 2012/0316685 A1 | 12/2012 | Pettersson | |
| 2015/0097950 A1 | 4/2015 | Wang et al. | |
| 2016/0020710 A1* | 1/2016 | Oda | H02N 2/0055 359/824 |
| 2017/0048439 A1 | 2/2017 | Von Borcke-Morawitz et al. | |
| 2018/0302548 A1* | 10/2018 | Bao | G03B 15/006 |
| 2018/0362183 A1* | 12/2018 | Lorell | B64C 39/024 |
| 2019/0049823 A1* | 2/2019 | Zhang | B60R 11/04 |

FOREIGN PATENT DOCUMENTS

| | | | |
|---|---|---|---|
| JP | 2008216477 A | * | 9/2008 |
| JP | 2008216477 A | | 9/2008 |
| JP | 2009058870 A | | 3/2009 |
| JP | 2014212392 A | | 11/2014 |
| JP | 2016082463 A | | 5/2016 |

OTHER PUBLICATIONS

Office Action issued in U.S. Appl. No. 15/995,886 dated Apr. 18, 2019.
Copending U.S. Appl. No. 15/995,886, filed Jun. 1, 2018.
Notice of Allowance issued in U.S. Appl. No. 15/995,886 dated Dec. 18, 2019.
Notice of Allowance issued in U.S. Appl. No. 15/995,886 dated Aug. 2, 2019.
Office Action issued in Chinese Appln. No. 201810558541.4 dated Jun. 28, 2020. English translation provided.
Office Action issued in Japanese Appln. No. 2017-110103 dated Apr. 6, 2021.
English translation of Japanese Publication No. 2008-216477, previously cited in IDS filed Apr. 22, 2021.

* cited by examiner

200

IMAGE PICKUP APPARATUS COMPRISING DRIVEN BODY DRIVEN BY ACTUATOR, AND MOVING BODY

BACKGROUND OF THE INVENTION

Field of the Invention

The present invention relates to an image pickup apparatus comprising a driven body driven by an actuator, and a moving body.

Description of the Related Art

In recent years, compact cameras called action cams or wearable cameras have been widespread (For example, see, Japanese Laid-Open Patent Publication (Kokai) No. 2016-82463). Such cameras are mounted not only on a body of a photographer but also on a bicycle or a drone (unmanned aircraft) as a moving body, and take movies while the moving body is moving.

FIGS. 12A and 12B are diagrams showing how to mount a conventional compact camera to a drone. FIG. 12A is an exploded view for use in explaining a mounting arrangement of the camera, and FIG. 12B is a perspective view of the drone to which the camera is mounted. In FIGS. 12A and 12B, a drone 1 is comprised of a quadcopter having a plurality, for example, four propellers, and stably holds (hovers) an airframe (main body) thereof in the air. The drone 1 is also capable of changing its posture by making the number of rotation of the propellers imbalanced to change a balance of the airframe. A compact camera 2 mounted on the drone 1 is comprised of an action cam. The camera 2 is equipped with an optical lens unit capable of performing relatively wide-angle shooting. The camera 2 is held by a gimbal 3, which is a holding member. The gimbal 3 is fixed to the drone 1 by screws 4, and the camera 2 is fixed to the gimbal 3 by a fixing member, not shown. For example, an adhesive double-sided tape and a bonding band are used as the fixing member. A posture stabilizing mechanism (not shown) which stabilizes the posture of the fixed camera 2 is built in the gimbal 3. The posture stabilizing mechanism controls movement of the camera 2 in a panning (horizontal) direction, a tilting (vertical) direction, and a rolling (rotating) direction, and eliminates an effect of a swing of the drone 1 on an image shot by the camera 2.

In order to change a direction in which the camera 2 of the drone 1 in FIGS. 12A and 12B shoots an image (herein after, referred to "the shooting direction"), it is necessary to change an orientation of a main body of the drone 1 as well as the gimbal 3, which imposes inconvenience on an operator of the drone 1. When the camera 2 is mounted on a handle of a bicycle, it is necessary to change an orientation of the handle in order to change the shooting direction, which also imposes inconvenience on a rider of the bicycle. Further, when the camera 2 is mounted on a body of a photographer, it is necessary to change an orientation of the body in order to change the shooting direction, which, after all, imposes inconvenience on the photographer.

Accordingly, it has been proposed that a rotational drive mechanism which is capable of relatively widely moving a camera in a panning direction and a tilting direction is mounted on a drone or a handle, and a shooting direction is changed without changing an orientation of a main body of the drone and an orientation of the handle (for example, see, Japanese Laid-Open Patent Publication (Kokai) No. 2009-58870).

In the rotational driving mechanism in Japanese Laid-Open Patent Publication (Kokai) No. 2009-58870, however, a tilt driving mechanism that transmits a driving force of a motor to a lens barrel by attaching a pulley to a rotational shaft of the lens barrel of the camera and winding a timing belt to the pulley. Particularly, in order to finely control a rotation of the lens barrel in the tilting direction, it is necessary to drastically decrease a rotational speed of the motor, and thus a plurality of pulleys and timing belts are necessary, which increases a size of the tilt driving mechanism. As a result, a size of an image pickup apparatus comprised of the camera and the rotational drive mechanism are also increased, which may decrease a degree of freedom of how to mount the image pickup apparatus on the drone or the handle of the bicycle. Particularly, a weight of the image pickup apparatus may exceed the maximum loading capacity in the drone.

SUMMARY OF THE INVENTION

The present invention provides a downsizable image pickup apparatus, and a downsizable moving body.

Accordingly, the present invention provides an image pickup apparatus having an image pickup unit, a base unit, and a supporting unit that is provided in a standing manner from the base unit and rotatably supports the image pickup unit, the image pickup apparatus comprising an actuator configured to drive the image pickup unit, wherein the actuator has a piezoelectric element and an oscillator including a transmission unit which transmits a driving force caused by vibration excited by the piezoelectric element, and the transmission unit is arranged in the supporting unit so as to be brought into pressure contact with the image pickup unit, and the image pickup unit has a transmitted plane with which the transmission unit is brought into pressure contact, and the vibration excited by the oscillator causes the transmitted plane with which the transmission unit is brought into pressure contact to move relatively to the oscillator.

According to the present invention, the actuator that drives the driven body is arranged at the supporting unit which supports the driven body in the standing manner from the base unit. Consequently, a space volume occupied by component elements of the image pickup apparatus can be decreased compared to a case where an actuator is arranged independently of the supporting unit, and thus the image pickup apparatus also can be downsized.

Further features of the present invention will become apparent from the following description of exemplary embodiments (with reference to the attached drawings).

DESCRIPTION OF THE EMBODIMENTS

Figure 1A:
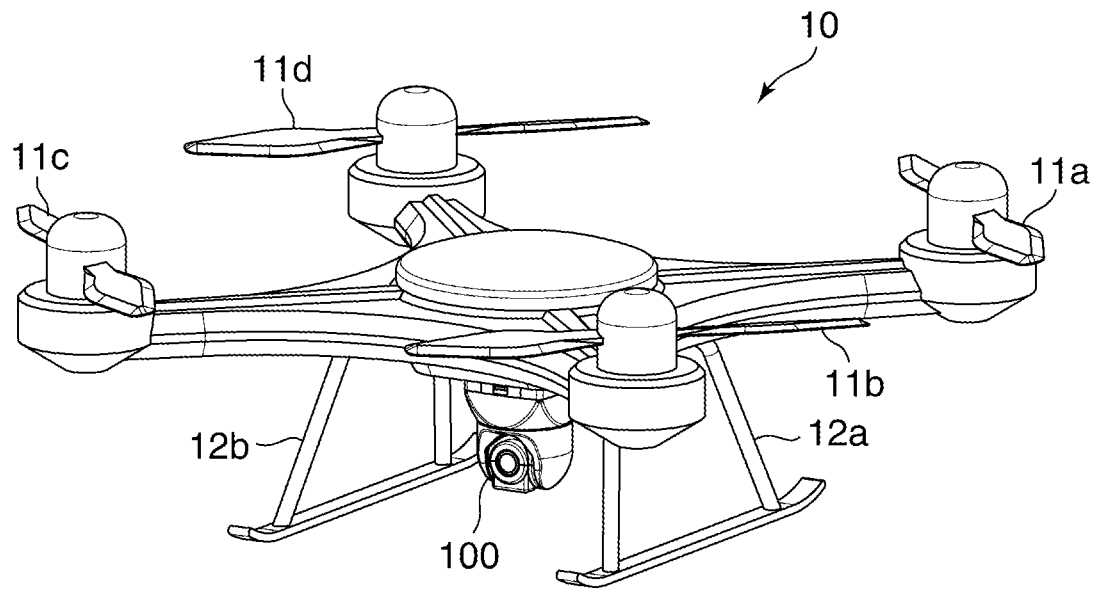
FIGS. 1A and 1B are views schematically showing an arrangement of a drone equipped with a camera as an image pickup apparatus according to a first embodiment of the present invention.

Hereinafter, a detailed description will be given of embodiments of the present invention by referring to the drawings. In the present embodiments, although a case where the present invention is applied to a camera as an image pickup apparatus which is mounted on a drone (moving body) as an unmanned aircraft will be explained, an application of the present invention is not limited to this. the present invention may be applied to general electronic apparatuses having a driven body which is driven by an actuator. The camera, to which the present invention is applied, can be mounted not only on a drone but another moving body (automobile or bicycle), and further on a body of a photographer. At first, a description will be given of an image pickup apparatus according to the first embodiment of the present invention.

Figure 1B:
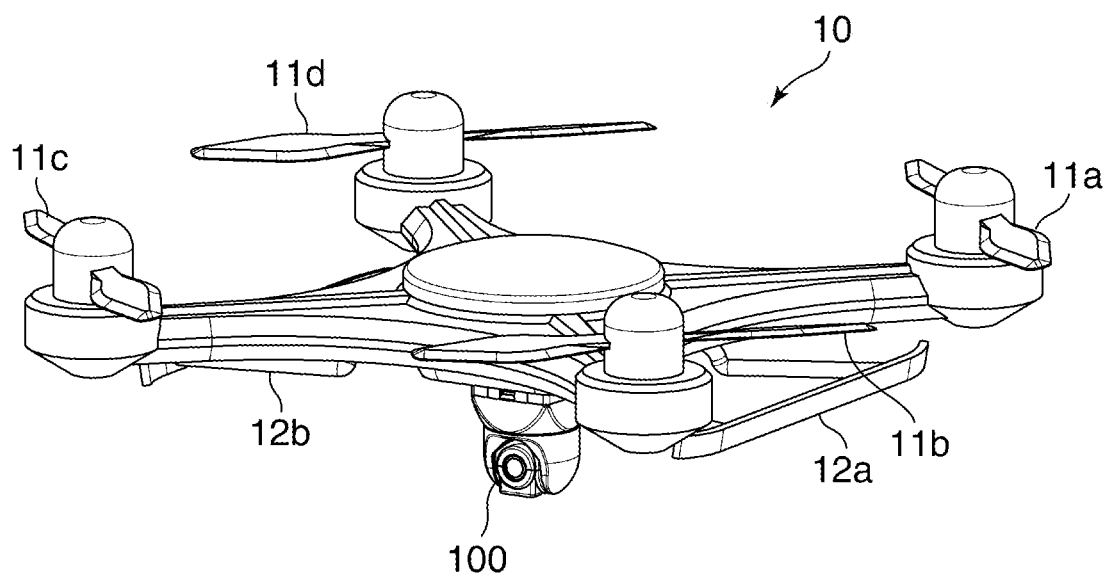

FIGS. 1A and 1B are views schematically showing an arrangement of a drone 10 equipped with a camera 100 as an image pickup apparatus according to the first embodiment of the present invention. FIG. 1A shows the drone 10 in a landing state, and FIG. 1B shows the drone 10 in a flying state.

In FIGS. 1A and 1B, the done 10 has four propellers 11*a* to 11*d* (hereinafter, collectively referred to as "propellers 11") (flying mechanism). the number of propellers varies according to a size, a weight, and an intended use, and so on of the drone 10. The drone 10 in FIG. 1 is comprised of a quadcopter having four propellers and flies by a lift force generated by the rotating propellers 11. By making the number of rotation of all the propellers 11 the same, a body of the drone 10 hovers in the air, and by making the number of rotation of the propellers 11 imbalanced, a balance of the body of the drone 10 is changed to change a posture of the drone 10.

A camera 100 is mounted on the drone 10. The camera 100 is mounted on the drone 10 by using, for example, an adhesive double-sided tape or a bonding band. The camera 100 may be mounted on the drone 10 by using a fitting tool such as an attachment. It should be noted that although a location in the drone 10 on which the camera 100 is mounted is not limitative, the camera 100 is mounted in a vicinity of a center or a lower part of the body of the drone 10 in terms of ease of shooting or consideration of a weight balance. The drone 10 also has skids 12*a*, 12*b* which is a pair of landing legs. The skids 12*a*, 12*b* are constructed in a foldable manner, protrude downwardly from the drone 10 at landing (FIG. 1A), and are pulled up toward the body of the drone 10 while flying (FIG. 1B). Consequently, the camera 100 mounted on the lower part of the body is prevented from being in contact with a ground and the like at landing, and the camera 100 is prevented from shooting the skid 12*a*, 12*b* while flying.

Figure 2:
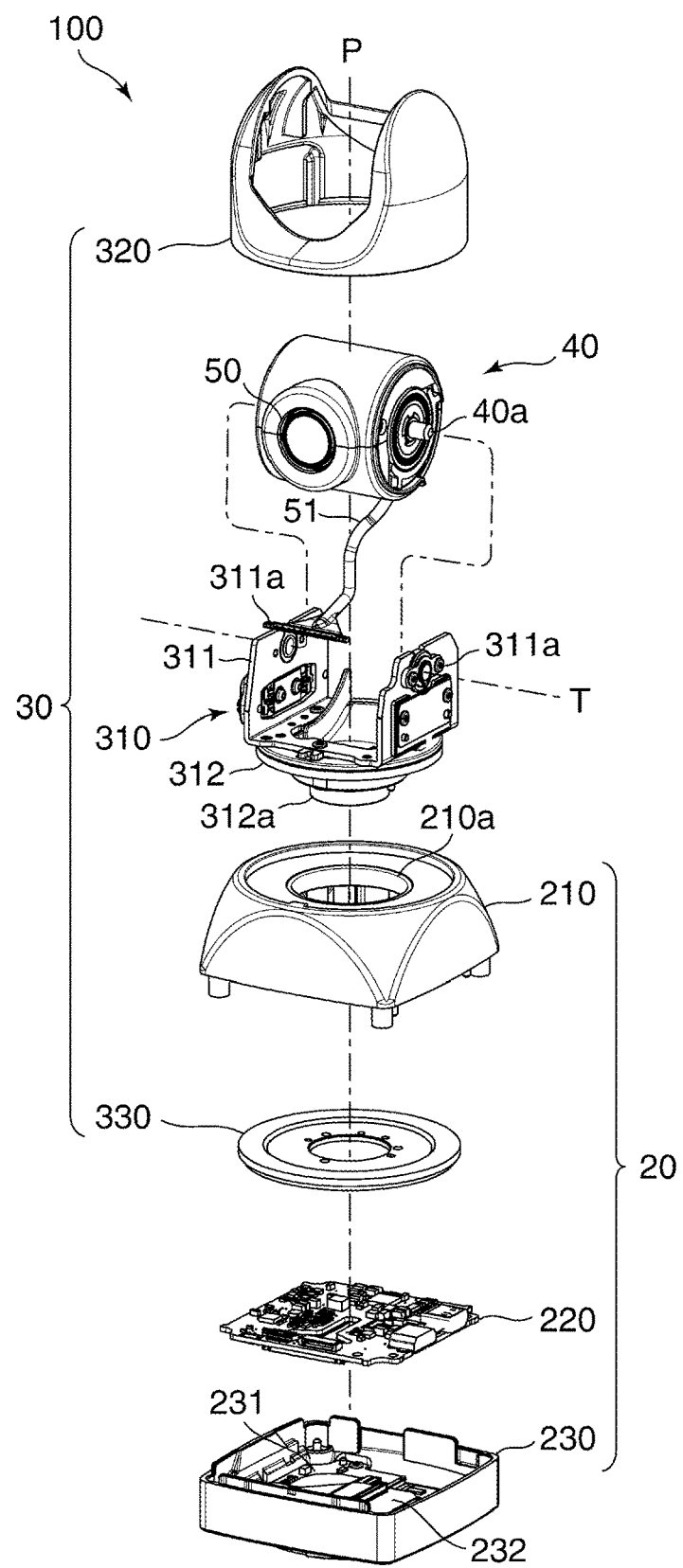
FIG. 2 is an exploded perspective view schematically showing an arrangement of the camera in FIG. 1.
Figure 3A:
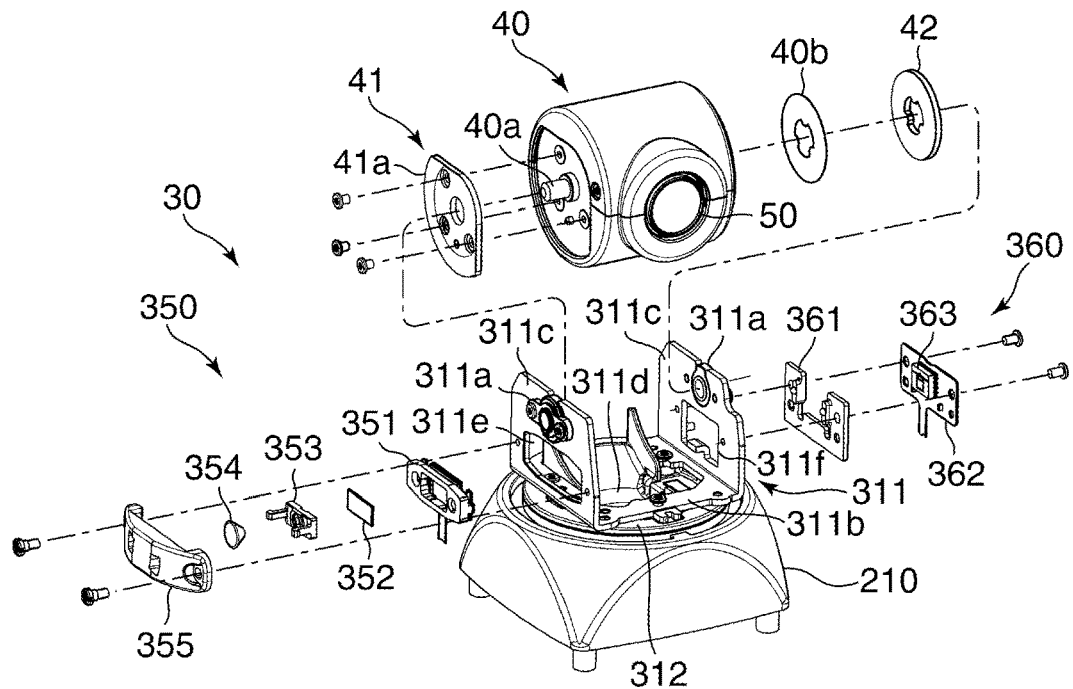
FIGS. 3A and 3B are exploded perspective views showing an arrangement of a panning unit of the camera in FIG. 2.
Figure 3B:
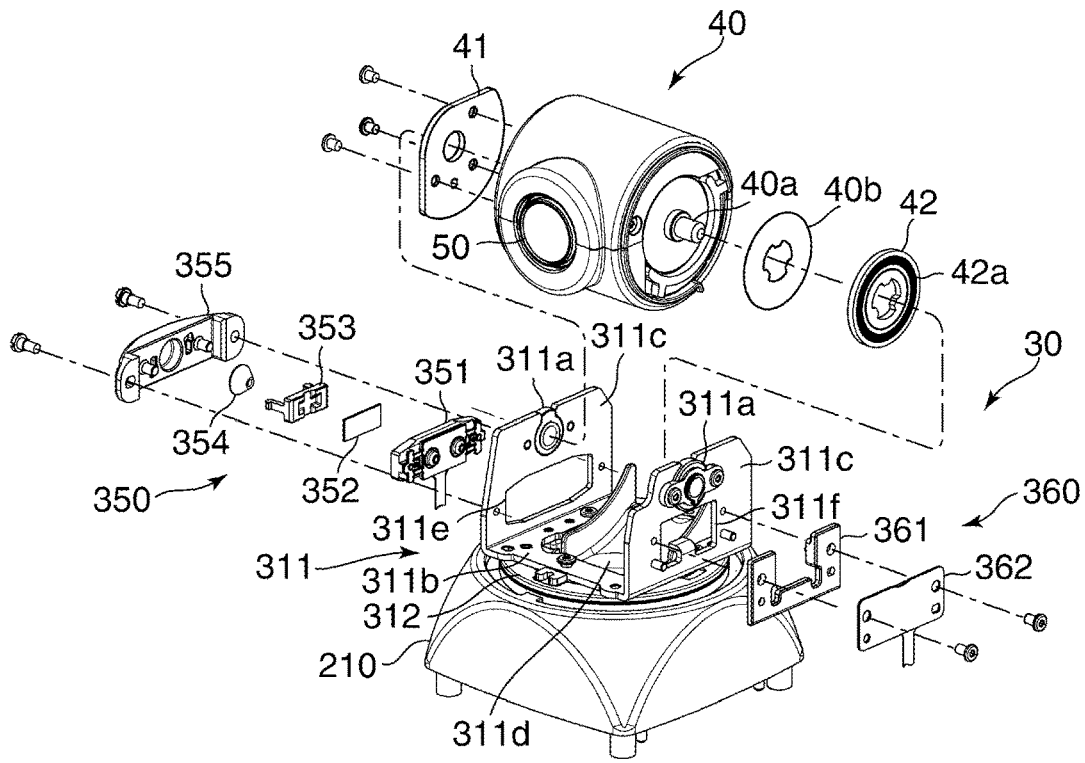
Figure 4:
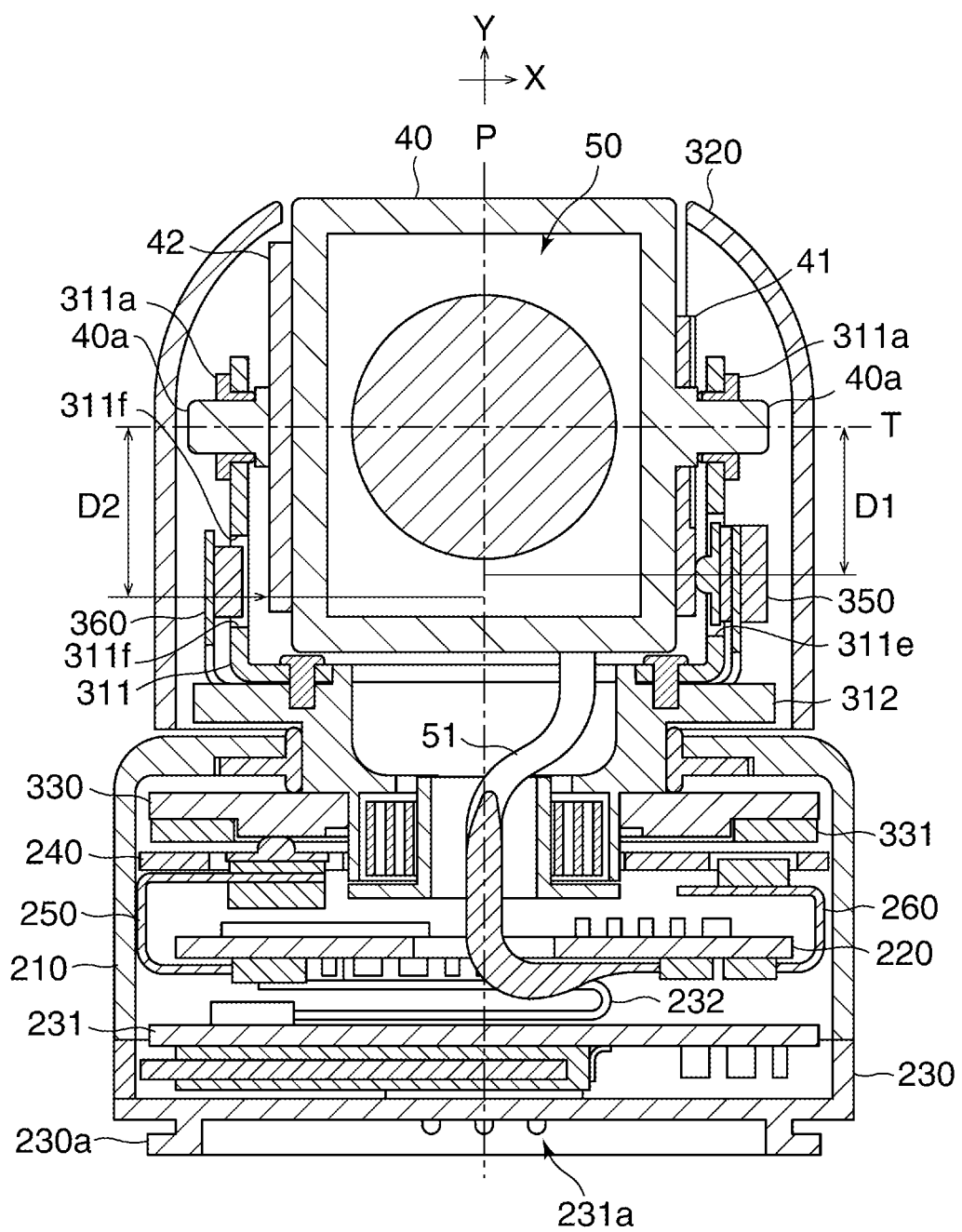
FIG. 4 is a vertical cross-sectional view schematically showing the arrangement of the camera in FIG. 2.
Figure 5A:
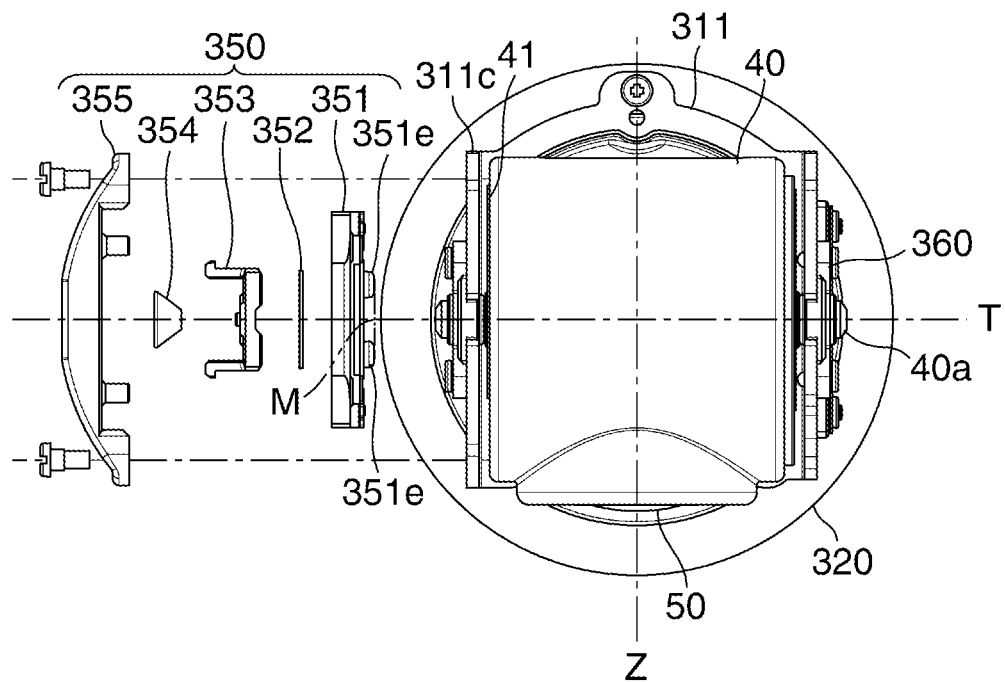
FIGS. 5A and 5B are plan views for use in explaining how to install a tilt driving unit and a tilting position detecting unit to a pan chassis of a pan unit.
Figure 5B:
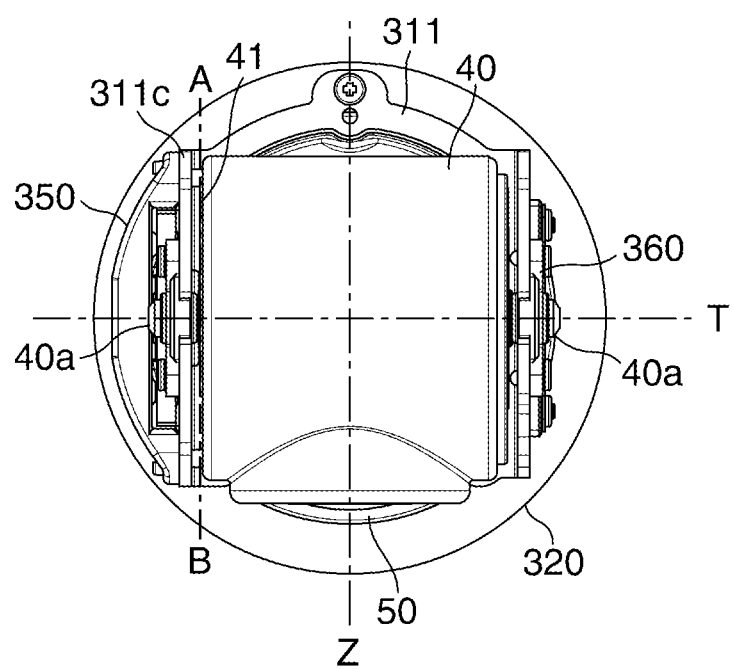

FIG. 2 is an exploded perspective view schematically showing an arrangement of the camera 100 in FIGS. 1A and 1B. FIGS. 3A and 3B are exploded perspective views showing an arrangement of a panning unit 30 of the camera 100 in FIG. 2. FIG. 4 is a vertical cross-sectional view schematically showing the arrangement of the camera 100 in FIG. 2. FIGS. 5A and 5B are plan views for use in explaining how to attach a tilt driving unit 350 and a tilting position detecting unit 360 to a pan chassis 311 of a pan unit 30. Particularly, FIGS. 3A and 3B show arrangements of the panning unit 30 when viewed from respectively different diagonal directions. FIG. 5A shows the tilt driving unit 350 in an exploded state, and FIG. 5B shows a state where the tilt driving unit 350 and the tilting position detecting unit 360 are attached to the pan chassis 311. It should be noted that in FIG. 4, for a convenience of explanation, a direction parallel to an axis T, to be described later, is defined as an X direction, a direction parallel to an axis P, to be described later, is defined as a Y direction, and a direction of an optical axis of a lens unit 50, to be described later by referring to FIGS. 5A and 5B, is defined as a Z direction.

In FIGS. 2 to 5B, the camera 100 has a base unit 20, the panning unit (hereinafter, referred to "the pan unit") 30, the tilting unit (hereinafter, referred to "the tilt unit") 40 which holds the lens unit 50 (image pickup unit). The pan unit 30 is placed on the based unit 20 in a horizontally rotatable (panning-enabled) manner, and the tilt unit 40 is installed to the pan unit 30 in a vertically rotatable (tilting-enabled) manner. The axis P in FIG. 2 indicates a central axis (another rotational axis) of horizontal rotation of the pan unit 30, and the axis T in FIG. 2 indicates a central axis (a rotational axis of the image pickup unit) of vertical rotation of the tilt unit 40. The axis P and the axis T intersect perpendicularly with each other. The lens unit 50 has an image pickup optical system and shoots a subject. Even when a flying posture of the drone 10 is stabilized while the drone 10 is flying, the subject can be shot from a variety of directions and angles by rotating the lens unit 50 horizontally or vertically by the pan unit 30 or the tilt unit 40. The camera 100 further has a wireless communication unit (not shown). The camera 100 receives an operation from an external device via the wireless communication unit. For example, the camera 100 receives operations such as remote shooting, transfer of a shot image, and so on from a terminal device such as a smart-phone.

The base unit 20 has a base cover 210, a control substrate 220, and a bottom cover 230. The control substrate 220 is equipped with a CPU which performs image processing, memory, and a driver IC which performs driving control for the pan unit 30 and the tilt unit 40. The bottom cover 230 is equipped with a recording portion 231 and a flexible printed circuit (herein after, referred to as "the FPC") 232. The recording portion 231 is, for example, a printed substrate mounting a connector in which a non-volatile memory of a card type can be accommodated, and is electrically connected to the control substrate 220 by the FPC 232. The camera 100 records a shot image by writing image data generated through image processing into the non-volatile memory mounted on the recording portion 231.

A pan unit 30 has a pan base 310, a pan cover 320, and a pan rotation plate 330. The pan base 310 has a pan chassis 311 (holding unit) formed by bending a plate metal through press working in a U-shape, and a disk-shaped panning base 312 made of resin which has been subjected to mold injection or the like. The pan chassis 311 is fixed to the panning base 312 by screws. The tilt unit 40 is comprised of cylindrical members arranged along a horizontal direction. A pair of tilt rotation supporting portions 311a, which are pivotally supporting members, including through holes are fastened by screws in a vicinity of an upper end of the pan chassis 311. The tilt rotation supporting portions 311a are formed by mold-injecting a resin having low friction and superior sliding characteristics (for example, polyacetal (POM) and the like). It should be noted that a rolling bearing such as a ball bearing and a roller bearing may be used as the tilt rotation supporting portions 311a. A tilt shaft portion 40a which protrudes from each surface of the tilt unit 40 along an axis T is fitted to each of the tilt rotation supporting members 311a. As a result, the tilt unit 40 is held by the pan chassis 311 and supported by the pan unit 30 in a rotatable (vertically rotatable) manner with the axis T at its central axis. The panning base 312 has a pan shaft portion 312a which protrudes downwardly, and the pan shaft portion 312a is fitted to a pan rotation supporting portion 210a, which is a pivotally supporting member, including a through hole drilled in the base cover 210 along the axis P. By fastening the pan rotation plate 330 comprised of a disk-shaped member to the panning base 312 on an inner side of the base cover 210, the pan unit 30 is placed on the base cover 210 in a rotatable (horizontally rotatable) manner with the axis P at its central axis. The lens unit 50 is electrically connected to the control substrate 220 by wiring 51. The wiring 51 is comprised of, for example, a plurality of electric wires formed by covering a conducting core with an insulator, a connector which is connected to both ends of the plurality of the electric wires, and an adhesive tape which bundles the plurality of electric wires over a certain length. The electric wire used for the wiring 51 may be, for example, a coaxial cable comprised of an inner conductor, an insulator, an external conductor, and a protective coating.

The pan chassis 311 comprised of the U-shaped member is comprised of a base portion 311b having a flat surface fasted to the panning base 312 by screws, and a pair of arm portions 311c which substantially vertically stands with respect to the base portion 311b. A tilt rotation plate 41 is fixed to one side face of the tilt unit 40 by screws. A tilt reflection scale 42 is attached to the other side of the tilt unit 40 by a double-sided tape 40b. When the tilt unit 40 is supported by the pan unit 30, the tilt rotation plate 41 and the tilt reflection scale 42 face each of the arm portions 311c. An opening 311d is formed in the base portion 311b, and an opening 311e (defective portion) and an opening 311f are formed in the arm portions 311c. It should be noted that the opening 311e and the opening 311f may be comprised of holes formed in the arm portions 311c, and may be formed by cutting a part of the arm portions 311c. The wiring 51 which extends from the tilt unit 40 is inserted into the opening 311d and connected to the control substrate 220. In the pan chassis 311, a tilt driving unit 350 (actuator), to be described later, is arranged so as to enter the opening 311e, and a tilting position detecting unit 360 (position detecting unit), to be described later, is arranged so as to enter the opening 311f.

In the camera 100, the control substrate 220 is fixed to the base cover 210 after the pan unit 30 and the tilt unit 40 are installed to the base cover 210. A plurality of connectors is mounted on the control substrate 220, and the FPCs which extend respectively from the tilt driving unit 350 and the tilting position detecting unit 360 as well as the wiring 51 are connected to the control substrate 220. The recording portion 231 is assembled to the bottom cover 230 in advance. A connector for connecting the FPC is mounted on the recording portion 231. One end of the FPC 232 is connected to the connector, and the other end of the FPC 232 is connected to a connector arranged in the control substrate 220 before the bottom cover 230 is assembled to the base cover 210. The bottom cover 230 is fixed to the base cover 210 by screws. Battery contacts 231a are mounted on a lower part of the recording portion 231. An opening is formed in the bottom cover 230 so as to face the battery contacts 231a, and tip portions of the battery contacts 231a are exposed from the opening. In the camera 100, an external power source (now shown) is mounted on the bottom cover 230. For example, a battery pack having an alkaline secondary battery or a lithium-ion secondary battery is used as the external power source. An installing portion 230a for the external power source is formed in the bottom cover 230, and when the external battery is fixed to the installing portion 230a, electric contacts of the external power source side are brought into contact with the battery contacts 231a, and power is supplied to the camera 100. It should be noted that the external power source may be mounted on the main body of the drone 10. In this case, when the camera 100 is mounted on the drone 10, the battery contacts 231a are brought into contact with electric contacts (not shown) formed on the lower part of the drone 10, and power is supplied from the drone 10 to the camera 100.

The tilt driving unit 350 is an actuator comprised of a so called ultrasonic motor which drives the driven body by using ultrasonic vibration. In a case where the ultrasonic motor is used, it is necessary for the ultrasonic motor to be brought into pressure contact with the driven body in order to transmit a driving force to the driven body. As will be described later, in the present embodiment, the tilt driving unit 350 is brought into pressure contact with the tilt unit 40. The tilt driving unit 350 has a driving unit 351 (transmitting unit), a felt 352, a presser 353, a spring 354, and a case 355.

Figure 6:
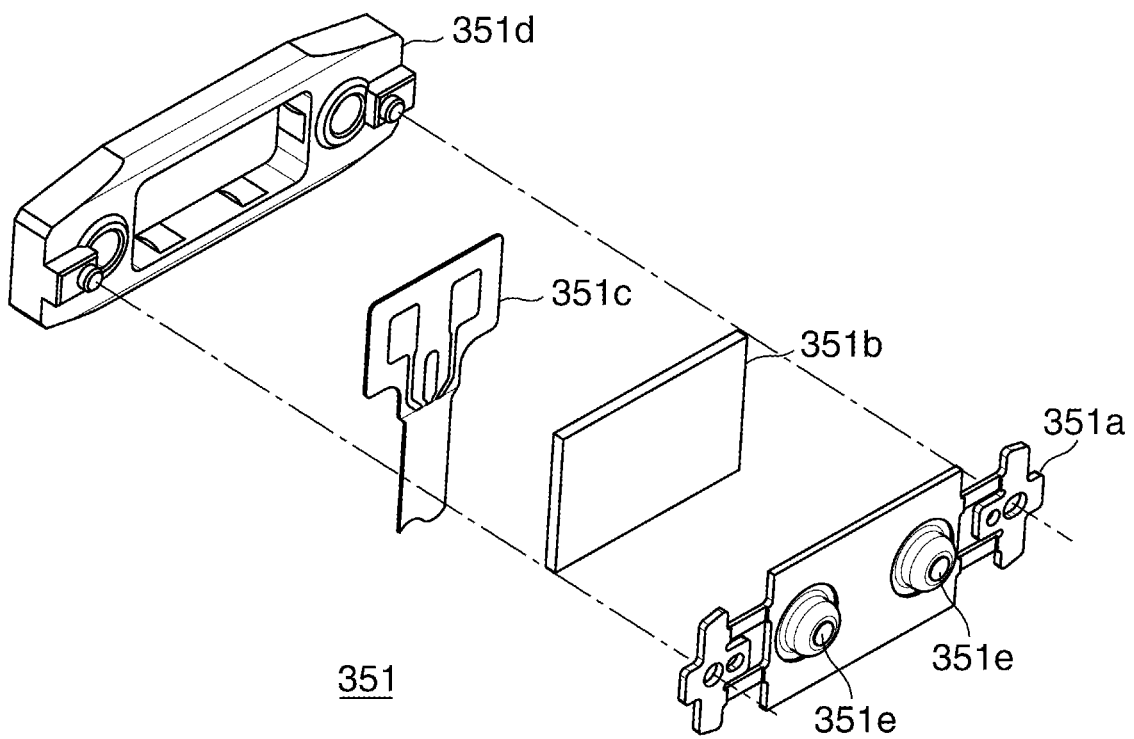
FIG. 6 is an exploded perspective view schematically showing an arrangement of a driving unit of a tilt driving unit.

FIG. 6 is an exploded perspective view schematically showing an arrangement of the driving unit 351 of the tilt driving unit 350. In FIG. 6, the driving unit 351 has an oscillator 351a, a piezoelectric element 351b, an FPC 351c which is a wiring member, and a base member 351d. The piezoelectric element 351b gives (excites) ultrasonic vibration to the oscillator 351a, and the FPC 351c is adhesively fixed to the piezoelectric element 351b to apply a high frequency voltage to the piezoelectric element 351b. The base member 351d holds the oscillator 351a, the piezoelectric element 351b, and the FPC 351c, and brings the oscillator 351a into pressure contact with the tilt unit 40 when the tilt driving unit 350 is attached to the arm portion 311c of the pan chassis 311. The FPC 351c is directly connected to the control substrate 220, and applies an arbitrary high frequency voltage to the piezoelectric element 351b depending on a control signal from the driver IC. The oscillator 351a has contact points 351e (protruding portions) comprised of a plurality of projections. When the high frequency voltage is applied to the piezoelectric element 351b, vibration with an arbitral frequency is excited in the oscillator 351a, which generates a driving force to drive the driven body in an arrangement direction of the contact points 351e. Because the oscillator 351a is brought into pressure contact with the tilt unit 40, the driving force is transmitted to the tilt unit 40, and the tilt unit 40 is relatively moved with respect to the tilt driving unit 350.

Referring again to FIGS. 2 to 5B, in tilt driving unit 350, the case 355 is fixed to the arm portion 311c by screws, and the spring 354 supported by the case 355 presses the driving unit 351 via the felt 352 and presser 353. The presser 353 is arranged in an interior of the base member 3511d of the driving unit 351, slidably moves in a direction parallel to the axis T, and transmits a local pressing force of the spring 354 over a wide range. Accordingly, in the tilt driving unit 350, the oscillator 351a is pressed without being tilted, and the plurality of contact points 351e of the driving unit 351 is equally pressed against the tilt unit 40. The felt 352 is arranged between the presser 353 and the driving unit 351, attenuates vibration generated by the oscillator 351a, and prevents the vibration from being transmitted to the presser 353 and the spring 354. The tilt driving unit 350 is attached to the arm portion 311c so that at least the contact points 351e enter the opening 311e of the arm portion 311c.

As described above, the tilt rotation plate 41 is fixed to the one side face of the tilt unit 40, and the contact points 351e are brought into pressure contact with a frictional sliding surface 41a (transmitted surface) of the tilt rotation plate 41. The frictional sliding surface 41a is subjected to a surface treatment such as lapping, and a highly flat and smooth plane is formed. Stainless material subjected to a hardening treatment such as nitriding is used for the tilt rotation plate 41. Accordingly, the tilt rotation plate 41 achieves stable contact and low wear amount of the contact points 351e at the same time. It should be noted that a cementation process in which carbons are added to a surface of the frictional sliding surface 41a and hardened, for example, may be used as the hardening treatment for the tilt rotation plate 41.

The tilting position detecting unit 360 has a spacer 361 and an FPC 362, and a tilt optical sensor 363 is mounted on the FPC 362. The FPC 362 is fixed to the arm portion 311c by screws via the spacer 361 so that a part of the tilt optical sensor 363 enters the opening 311f of the arm portion 311c. As described above, the tilt reflection scale 42 is provided on the other side face of the tilt unit 40, and the tilting position detecting unit 360 is attached to the arm portion 311c so that the tilt optical sensor 363 and the tilt reflection scale 42 face with each other with a predetermined space sandwiching therebetween. The FPC 362 is connected to the control substrate 220 via wiring (not shown), and outputs a detection result of the tilt optical sensor 363 to the CPU. The tilt reflection scale 42 has an optical grid 42a (reflecting portion) comprised of a plurality of contrast patterns arranged in a circumference direction around the tilt shaft portion 40a at constant intervals. A resin such as acryl (PMMA) or polycarbonate (PC) is used for a base material of the tilt reflection scale 42. In the tilt reflection scale 42, the optical grid 42a comprised of an aluminum film, for example, is formed as a reflection film on a surface of the base material. It should be noted that the base material for the tilt reflection scale 42 is not limited to the above materials, and quartz glass, blue sheet glass, or silicon wafer, for example, may be used for the base material. Chromium film, for example, may be used for the optical grid 42a.

Figure 7A:
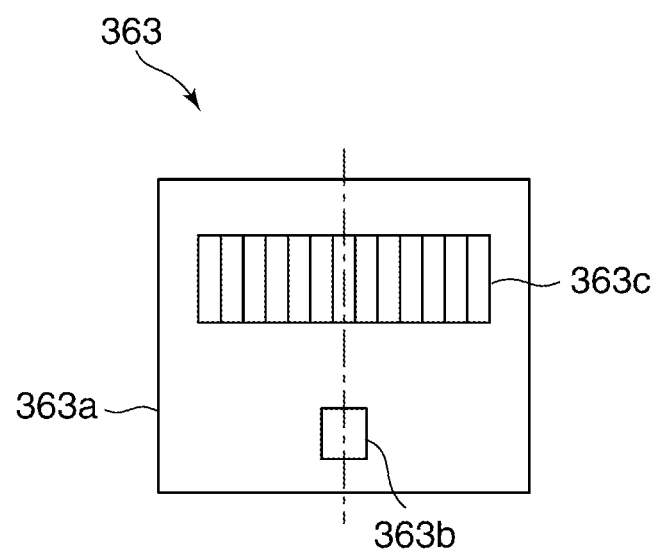
FIGS. 7A and 7B are views schematically showing an arrangement of a tilt optical sensor of the tilting position detecting unit.
Figure 7B:
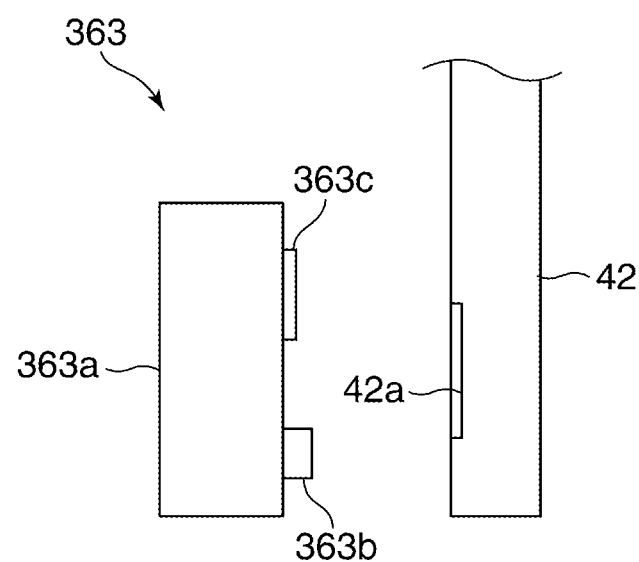

FIGS. 7A and 7B are views schematically showing an arrangement of the tilt optical sensor 363 of the tilting position detecting unit 360. FIG. 7A is a view of the tilt optical sensor 363 as viewed from a tilt unit 40 side, and FIG. 7B is a view of the tilt optical sensor 363 as viewed from a front side of the camera 100. The tilt optical sensor 363 comprises a substrate 363a, and a light-emitting portion 363b and a light-receiving portion array 363c, both being mounted on the substrate 363a. The light-emitting portion 363b emits light to the tilt reflection scale 42, and the light-receiving portion array 363c receives a reflected light from the tilt reflection scale 42. For example, a light-emitting diode is used for the light-emitting portion 363b, and a phototransistor is used for the light-receiving portion array 363c. Specifically, the light-receiving portion array 363c is comprised of a plurality of phototransistors arranged in a range to which a reflected light from the contrast patterns of the optical grid 42a resulting from light emitted from the light-emitting portion 363b is incident. The tilt optical sensor 363 receives the reflected light from the contrast patterns of the optical grid 42a using the light-receiving portion array 363c, and converts the received reflected light into an electric signal. The reflected light from the contrast patterns of the optical grid 42a forms an image of a reflective pattern, that is, a so called reflectance distribution image. The light-receiving portion array 363c subjects the reflectance distribution image to a photoelectrical conversion and outputs an electric signal having a waveform of sinusoid according to a light quantity distribution of the reflectance distribution image. In the camera 100, when the tilt reflection scale 42 and the tilt optical sensor 363 move relatively with each other, the reflectance distribution image formed by the reflected light from the contrast patterns of the optical grid 42a varies. By reading the electric signal having a waveform of sinusoid according to this change, the camera 100 detects a rotational position of the tilt unit 40. Then, a rotational direction of the tilt unit 40 is detected by reading varying of a direction of the reflected light incident from the optical grid 42a to the light-receiving portion array 363.

Figure 8:
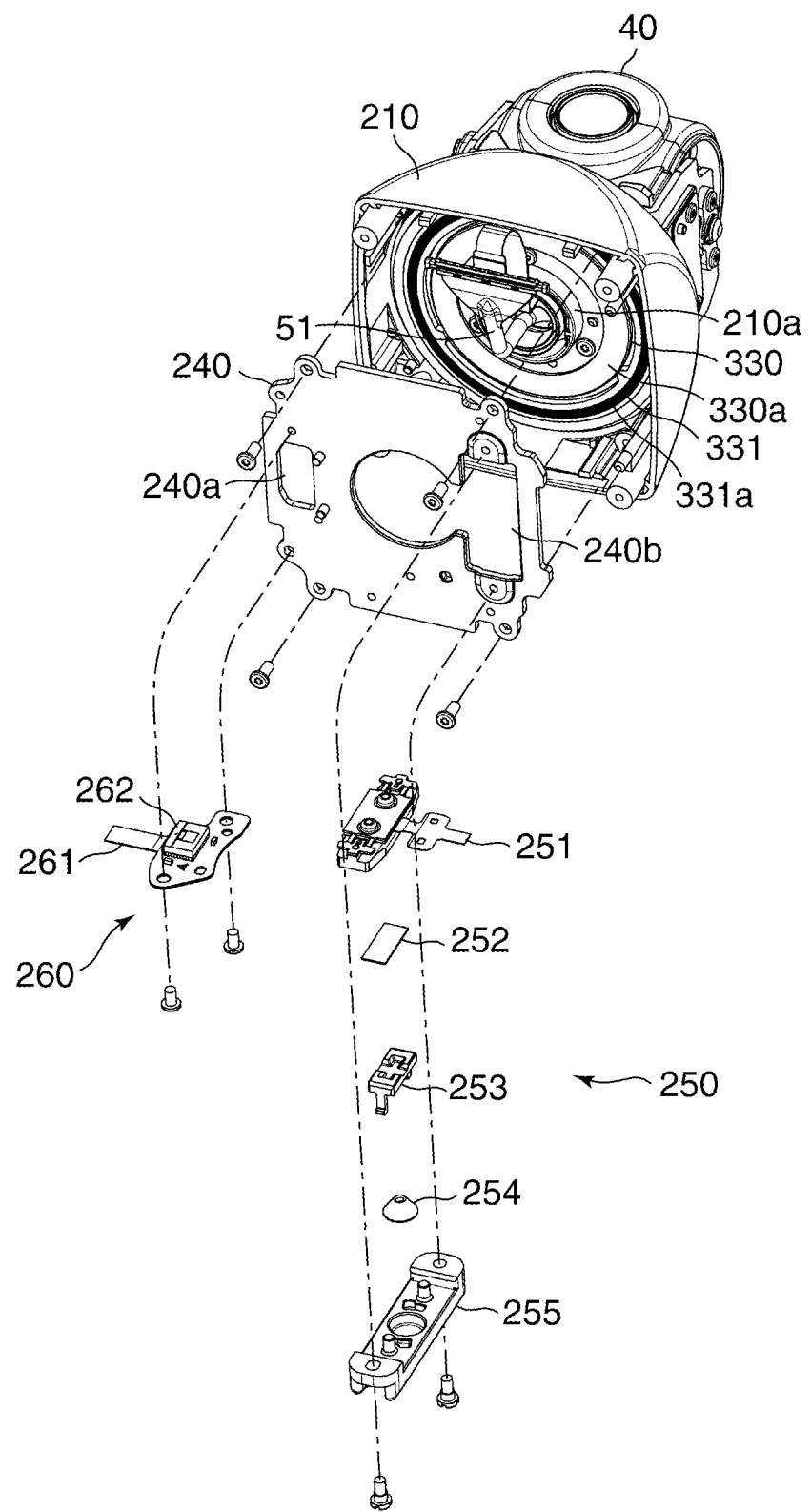
FIG. 8 is an exploded perspective view schematically showing an internal arrangement of a base unit in FIG. 2.

FIG. 8 shows an exploded perspective view schematically showing an internal arrangement of the base unit 20 in FIG. 2. FIG. 8 indicates a state where the pan unit 30 attached to the tilt unit 40 is held in advance by the base cover 210 in a rotatable manner in the horizontal rotational (panning) direction. In this case, a pan shaft portion 312a is fitted into a pan rotation supporting portion 210a, and the pan rotation supporting portion 210a is formed by mold-injecting a resin having low friction and superior sliding characteristics (for example, polyacetal (POM) and the like) as is the case with the tilt rotation supporting portion 311a. It should be noted that a rolling bearing such as a ball bearing and a roller bearing may be used as the pan rotation supporting portion 210a. As a result, the pan unit 30 is supported by the base unit 20 in a smoothly rotatable (horizontally rotatable) manner about the axis P. A pan rotation plate 330 is fixed to a pan shaft portion 312a of the pan unit 30 from a bottom side of the camera 100 by screws. A pan reflection scale 331 is attached to the pan rotation plate 330 by a double-sided tape, not shown. After the pan rotation plate 330 and the pan reflection scale 331 are installed to the base cover 210, a main chassis 240 is installed from the bottom side of the camera 100 and fixed to the base cover 210 by screws. An opening 240a and an opening 240b as well as screw holes are formed in the main chassis 240. The opening 240b is comprised of a circular opening and a rectangular opening arranged adjacent to each other. The wiring 51 extending from the tilt unit 40 is inserted into the circular opening of the opening 240b and connected to the control substrate 220. The pan driving unit 250 which drives the pan unit 30 and the panning position detecting unit 260 which detects rotation of the pan unit 30 are attached to the main chassis 240. Specifically, the pan driving unit 250 is arranged so as to enter the rectangular opening of the opening 240b, and the panning position detecting unit 260 is arranged so as to enter the opening 240a. The pan driving unit 250 is an actuator comprised of an ultrasonic motor having the same arrangement as the tilt driving unit 350 described earlier. Accordingly, as to be described later, in the present embodiment, the pan driving unit 250 is brought into pressure contact with the pan rotation plate 330 fastened to the pan unit 30 in order to transmit the driving force. The pan driving unit 250 has a driving unit 251, a felt 252, a presser 253, a screw 254, and a case 255.

Figure 9:
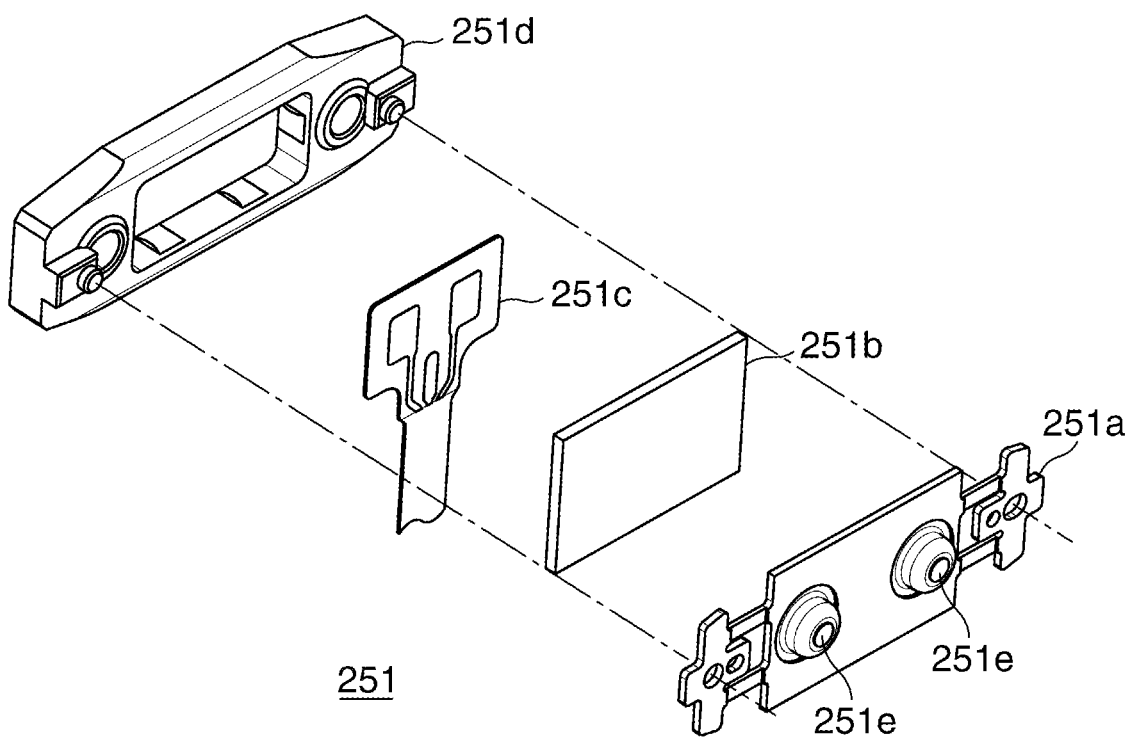
FIG. 9 is an exploded perspective view schematically showing an arrangement of a driving unit of a pan driving unit.

FIG. 9 is an exploded perspective view schematically showing an arrangement of the driving unit 251 of the pan driving unit 250. In FIG. 9, the driving unit 251 has an oscillator 251a, a piezoelectric element 251b, an FPC 251c which is a wiring member, and a base member 251d. The piezoelectric element 251b gives ultrasonic vibration to the oscillator 251a, and the FPC 251c is adhesively fixed to the piezoelectric element 251b to apply a high frequency voltage to the piezoelectric element 251b. The base member 251d holds the oscillator 251a, the piezoelectric element 251b, and the FPC 251c, and brings the oscillator 251a into pressure contact with the pan rotation plate 330 when the pan driving unit 250 is attached to the main chassis 240. The FPC 251c is directly connected to the control substrate 220, and applies an arbitrary high frequency voltage to the piezoelectric element 251b depending on a control signal from the driver IC. The oscillator 251a has contact points 251e comprised of a plurality of projections. When the high frequency voltage is applied to the piezoelectric element 251b, vibration with an arbitral frequency is excited in the oscillator 251a, which generates a driving force to drive the driven body in an arrangement direction of the contact points 251e. Because the oscillator 251a is brought into pressure contact with the pan rotation plate 330, the driving force is transmitted to the pan rotation plate 330, and the pan unit 30 is relatively moved with respect to the pan driving unit 250.

In the pan driving unit 250, the case 255 is fixed to the main chassis 240 by screws, and a spring 254 supported by the case 255 presses the driving unit 251 via the felt 252 and presser 253. The presser 253 is arranged in an interior of the base member 251d of the driving unit 251, slidably moves in a direction parallel to the axis P, and transmits a local pressing force of the spring 254 over a wide range. Accordingly, in the pan driving unit 250, the oscillator 251a is pressed without being tilted, and the plurality of contact points 251e of the driving unit 251 is equally pressed against the pan rotation plate 330. The felt 252 is arranged between the presser 253 and the driving unit 251, attenuates vibration generated by the oscillator 251a, and prevents the vibration from being transmitted to the presser 253 and the spring 254. The pan driving unit 250 is attached to the main chassis 240 so that at least the contact points 251e enter the rectangular opening of the opening 240b of the main chassis 240.

A frictional sliding surface 330a is formed in a lower surface of the pan rotation plate 330, and the contact points 251e are brought into pressure contact with the frictional sliding surface 330a. The frictional sliding surface 330a is subjected to a surface treatment such as lapping, and a highly flat and smooth plane is formed. Stainless material and so on subjected to a hardening treatment such as nitriding is used for the pan rotation plate 330. Accordingly, the pan rotation plate 330 achieves stable contact and low wear amount of the contact points 251e at the same time. It should be noted that a cementation process in which carbons are added to a surface of the frictional sliding surface 330a and hardened, for example, may be used as the hardening treatment for the pan rotation plate 330.

The panning position detecting unit 260 has a FPC 261, and a pan optical sensor 262 is mounted on the FPC 261. The FPC 261 is fixed to the main chassis 240 by screws so that a part of the pan optical sensor 262 enters the opening 240a of the main chassis 240. As described above, the pan reflection scale 331 is provided on the lower surface of the pan rotation plate 330, and the panning position detecting unit 260 is attached to the main chassis 240 so that the pan optical sensor 262 and the pan reflection scale 331 face with each other with a predetermined space sandwiching therebetween. The FPC 261 is connected to the control substrate 220 via wiring (not shown), and outputs a detection result of the pan optical sensor 262 to the CPU. The pan reflection scale 331 has an optical grid 331a comprised of a plurality of contrast patterns arranged in a circumference direction around the axis P (pan shaft portion 312a) at constant intervals. A resin such as acryl (PMMA) or polycarbonate (PC) is used for a base material of the pan reflection scale 331. In the pan reflection scale 331, the optical grid 331a comprised of an aluminum film, for example, is formed as a reflection film on a surface of the base material. The base material of the pan reflection scale 331 is not limited to the above materials, and quartz glass, blue sheet glass, or silicon wafer, for example, may be used for the base material. Chromium film, for example, may be used for the optical grid 331a.

Figure 10A:
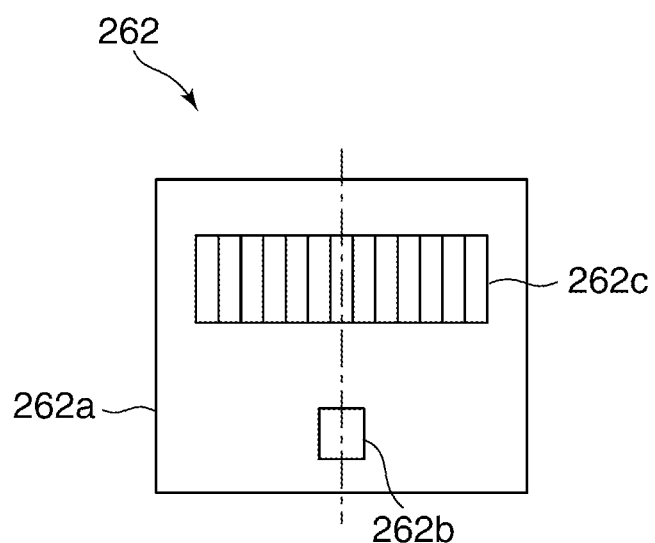
FIGS. 10A and 10B are views schematically showing an arrangement of a pan optical sensor of a panning position detecting unit.
Figure 10B:
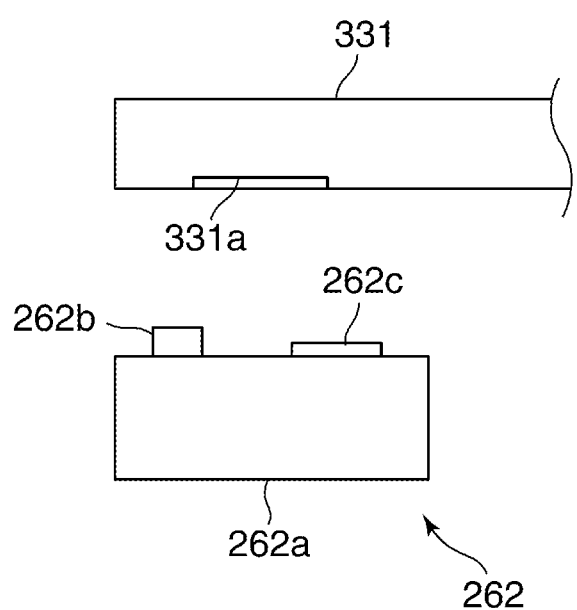

FIGS. 10A and 10B are views schematically showing an arrangement of the pan optical sensor 262 of the panning position detecting unit 260. FIG. 10A is a view of the pan optical sensor 262 as viewed from a pan unit 30 side, and FIG. 10B is a view of the pan optical sensor 262 as viewed from the front side of the camera 100. The pan optical sensor 262 comprises a substrate 262a, and a light-emitting portion 262b and a light-receiving portion array 262c, both being mounted on the substrate 262a. The light-emitting portion 262b emits light to the pan reflection scale 331, and the light-receiving portion array 262c receives a reflected light from the pan reflection scale 331. For example, a light-emitting diode is used for the light-emitting portion 262b and a phototransistor is used for the light-receiving portion array 262c. Specifically, the light-receiving portion array 262c is comprised of a plurality of phototransistors arranged in a range to which a reflected light from the contrast patterns of the optical grid 331a resulting from light emitted from the light-emitting portion 262b is incident. The pan optical sensor 262 receives the reflected light from the contrast patterns of the optical grid 331a using the light-receiving portion array 262c, and converts the received reflected light into an electric signal. The reflected light from the contrast patterns of the optical grid 331a forms an image of a reflective pattern, that is, a so called reflectance distribution image. The light-receiving portion array 262c subjects the reflectance distribution image to a photoelectrical conversion and outputs an electric signal having a waveform of sinusoid according to a light quantity distribution of the reflectance distribution image. In the camera 100, when the pan reflection scale 331 and the pan optical sensor 262 move relatively with each other, the reflectance distribution image formed by the reflected light from the contrast patterns of the optical grid 331a varies. By reading the electric signal having a waveform of sinusoid according to this change, the camera 100 detects a rotational position of the pan unit 30. Then, a rotational direction of the pan unit 30 is detected by reading varying of a direction of the reflected light incident from the optical grid 331a to the light-receiving portion array 262c.

Referring again to FIGS. 5A and 5B, in the camera 100, the tilt driving unit 350 is installed into the arm portion 331c so that a middle point M of a virtual straight line connecting the pair of contact points 351e in a projective view from an upper surface (as viewed along the axis P). More specifically, the tilt driving unit 350 is arranged so that the middle point M of the virtual straight line is positioned on a virtual plane defined by the axis T and the axis P. Accordingly, the driving force of the driving unit 351 is uniformly (in well-balance) transmitted to the tilt unit 40, and thus the tilt unit 40 is smoothly rotated.

In the tilt driving unit 350, the case 355, the spring 354, the felt 352, the presser 353, and the driving unit 351 are arranged in an overlapped manner, and thus the tilt driving unit 350 has a certain level of thickness. As described above, however, the tilt driving unit 350 is arranged so that at least the contact points 351e of the driving unit 351 enter the opening 311e of the arm portion 311c, and the case 355 is fixed to the arm portion 311c without sandwiching another member therebetween. Therefore, an amount of projection of the tilt driving unit 350 from the arm portion 311c along the axis T is decreased. Specifically, when viewed along the axis P, the tilt driving unit 350 assembled to the arm portion 311c is accommodated in a region in which the pan chassis 311 rotates. More specifically, when viewed along the axis P, the tilt driving unit 350 is accommodated in a region between a chord A-B defined by points A and B where the virtual straight line along the surface of the tilt rotation plate 41 intersects with an outer edge of the pan cover 320, and an arc A-B in the outer edge of the pan cover 320. As a result, a space volume occupied by the component elements of the camera 100 is decreased, and thus the camera 100 is downsized.

As shown in FIG. 4, the tilt driving unit 350 is arranged between the tilt shaft portion 40a (tilt rotation supporting portion 311a) and the panning base 312. As described earlier, the tilt unit 40 holds the lens unit 50, and the center of the optical axis of the lens unit 50 intersects with the axis T in a state where the lens unit 50 faces a front. Accordingly, an amount of oscillation of the lens unit 50 (tilt unit 40) at the time of tilting rotation about the axis T is decreased, and thus, the camera 100 is downsized.

In the camera 100, the tilt unit 40 as a whole is positioned slightly above the base unit 20 by positioning the tilt unit 40 so that the center of the optical axis of the lens unit 50 intersects with the axis T. Accordingly, a certain space is ensured between the tilt shaft portion 40a (tilt rotation supporting portion 311a) and the panning base 312. Consequently, the tilt driving unit 350 is arranged in the space. As a result, the space volume occupied by the component elements of the camera 100 is decreased compared to a case where the tilt driving unit 350 is arranged in a space other than the space, and thus the camera 100 is downsized.

In addition, in the camera 100, since the tilt driving unit 350 is brought into pressure contact with the tilt unit 40 to directly transmit the driving force, it is possible to dispense with a gear or a pulley for driving the tilt unit 40. Accordingly, the camera 100 is further downsized. Furthermore, in camera 100, the tilting position detecting unit 360 is attached to the arm portion 311c other than the arm portion 311c to which the tilt driving unit 350 is attached. Accordingly, a space between the tilt shaft portion 40a (tilt rotation supporting portion 311a) and the panning base 312 is effectively utilized and the space volume occupied by the component elements of the camera 100 is further decreased.

In the camera 100, if a distance from the axis T pertaining to the Y direction (a rotational center of the tilt unit 40) to the contact points 351e of the tilt driving unit 350 in FIG. 4 is assumed as D1, shorter distance D1 is preferable. Accordingly, a moving angle (an amount of rotational movement) of the tilt unit 40 per one oscillation of the contact points 351e becomes large, and thus a rotational moving speed of the tilt unit 40 is increased. At this time, the distance D1 is determined in light of frictional load on the tilt rotation supporting portion 311a and the tilt shaft portion 40a, a weight of the tilt unit 40, sliding frictional load on wiring 51 while the tilt unit 40 is rotating, and a driving force which the tilt driving unit 350 is able to generate. Moreover, if a distance from the axis T pertaining to the Y direction to a detecting point where the tilt optical sensor 363 detects the reflected light from the optical grid 42a is assumed as D2, longer distance D2 is preferable. Accordingly, the amount of rotational movement of the tilt unit 40 per a movement angle unit at the detecting point is increased, and thus an accuracy of the reflectance distribution image obtained by the tilt optical sensor 363 is improved. At this time, the distance D2 is determined in light of a maximum diameter of the tilt reflection scale 42 which can be accommodated in the pan cover 320. In particular, it is preferable to set arrangements and sizes of the components elements of the camera 100 so that the distance D1 is equal to or shorter than the distance D2. Consequently, a high-speed tilting operation and improvement in accuracy of a tilt rotation detection can be achieved at the same time.

It should be noted that the control substrate 220 and the bottom cover 230 are assembled to the base cover 210 after installation of the pan unit 30 and the tilt unit 40 to the base cover 210, and then assembly of the camera 100 is completed In the present embodiment, although the tilt rotation plate 41 and the tilt reflection scale 42, which are independent components, are attached to the tilt unit 40, the frictional sliding surface 41a and the optical grid 42a may be formed directly on the both sides of the tilt unit 40, respectively. Accordingly, the double-sided tape 40b can be dispensed with, a length of the tilt unit 40 along the axis T can be made shorter, and the camera 100 can be further downsized. Although the pan base 310 is comprised of the pan chassis 311 formed by the plate metal and the panning base 312 formed of resin, the pan chassis 311 and the panning base 312 may be integrally formed of a high-strength resin material.

Next, a description will be given of an image pickup apparatus according to a second embodiment of the present invention. The second embodiment is basically the same as the first embodiment described above in terms of constructions and operations. Features of constructions and operations that are the same as those in the first embodiment will thus not be described, only constructions and operations different from those of the first embodiment being described below.

Figure 11:
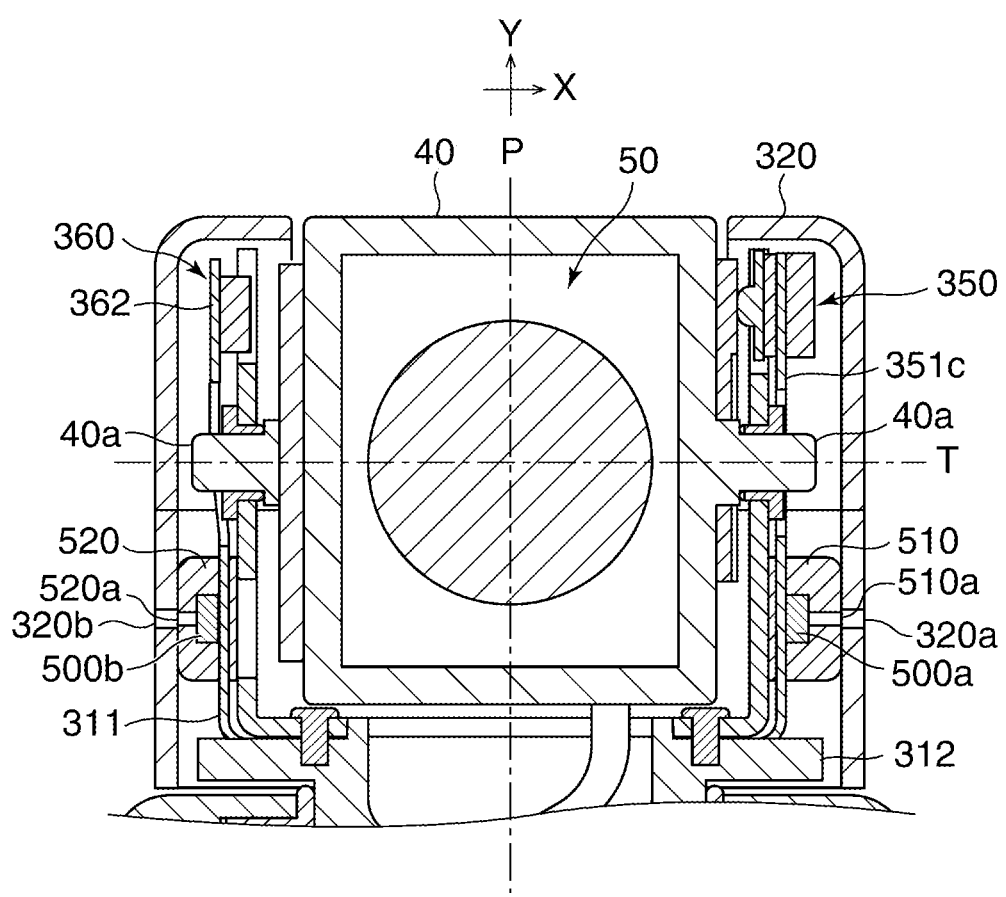
FIG. 11 is a vertical cross-sectional view schematically showing an arrangement of a camera as an image pickup apparatus according to a second embodiment of the present invention.
Figure 12A:
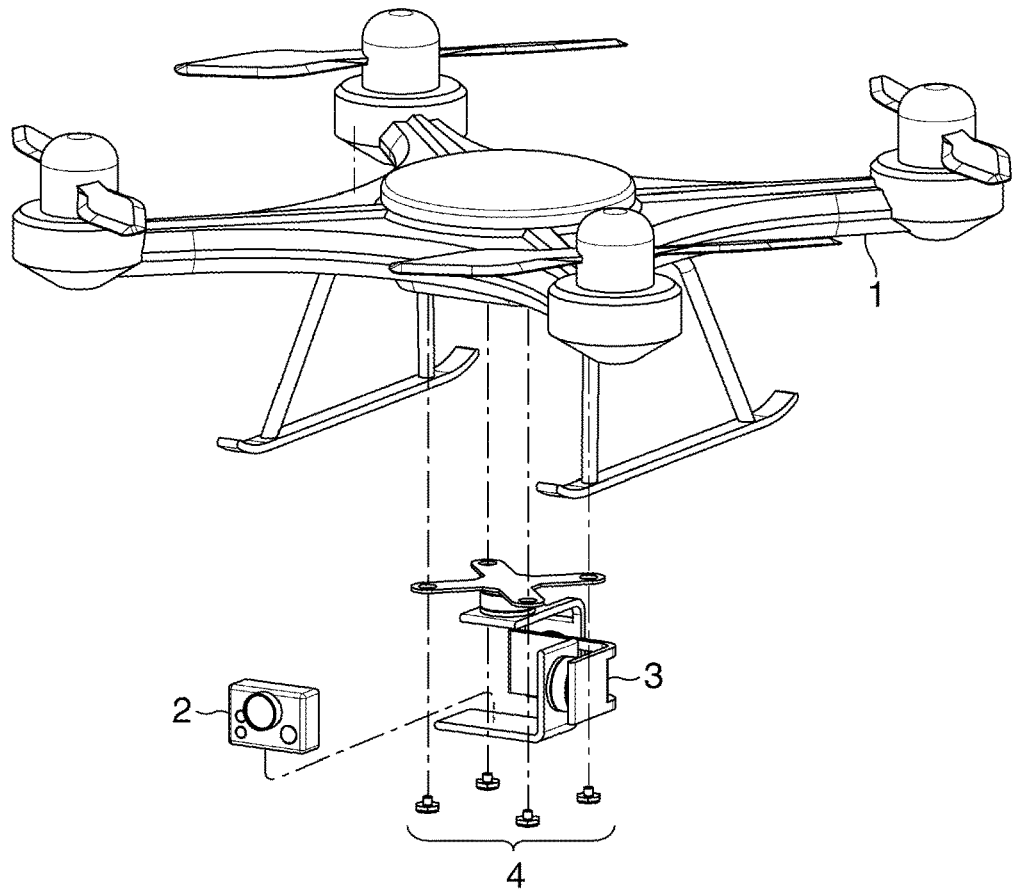
FIGS. 12A and 12B are views showing how to mount a conventional compact camera to a drone.
Figure 12B:
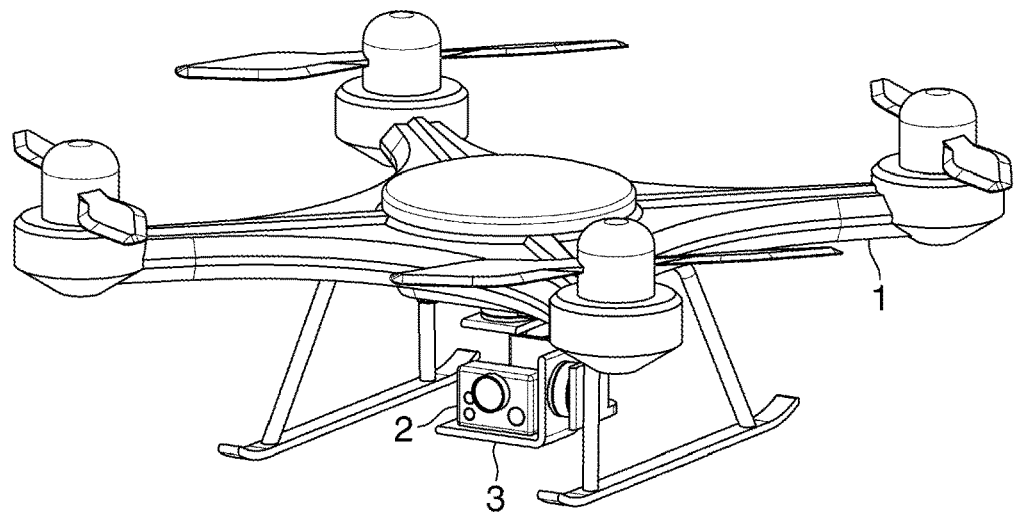

FIG. 11 is a vertical cross-sectional view schematically showing an arrangement of a camera as the image pickup apparatus according to the second embodiment of the present invention. It should be noted that as is the case with FIG. 4, a direction parallel to the axis T is defined as the X direction, and a direction parallel to the axis P is defined as an Y direction in FIG. 11 for ease of explanation.

In the camera 200 as an image pickup apparatus according to the present embodiment, the arm portions 311c of the pan chassis 311 extends more upwardly than the arm portions 311c of the camera 100. The tilt driving unit 350 and the tilting position detecting unit 360 are attached to the arm portions 311c at upper locations than the axis T. Accordingly, other component elements can be arranged in a certain space between the tilt shaft portion 40a and the panning base 312. As a result, in camera 200, microphones (herein after merely referred to as "mikes") 500a and 500b are arranged in the space. A condenser microphone, a MEMS (micro electro mechanical system) microphone, and so on, are used for mikes 500a and 500b. The mike 500a is mounted on the FPC 351c extending downwardly from the tilt driving unit 350 and electrically connected to the control substrate 220. The mike 500b is mounted on the FPC 362 extending downwardly from the tilting position detecting unit 360 and electrically connected to the control substrate 220. bushings 510 and 520 are attached to the mikes 500a and 500b, respectively. An elastic member such as an ethylene propylene diene rubber (EPDM) or a silicone rubber is used for the bushings 510 and 520. Sound collecting holes 510a and 520a are formed in the bushings 510 and 520 correspondingly to sound collecting parts of the mikes 500a and 500b. Sound collecting holes 320a and 320b are formed in the pan cover 320 correspondingly to the sound collecting holes 510a and 520a. In an interior of the pan cover 320, the mikes 500a and 500b and bushings 510 and 520 are sandwiched between and held by the pan cover 320 and the pan chassis 311. The bushing 510 and 520 are adhered tightly to an inner peripheral surface of the pan cover 320 and collect sounds from the sounding holes 320a and 320b without any sound leakage.

In the camera 200, by arranging the tilt driving unit 350 and the tilting position detecting unit 360 more upwardly than the axis T, the mikes 500a and 500b can be arranged without upsizing the camera 200 in the direction of the axis T compared to the camera 100. In the camera 200, by arranging the mikes 500a and 500b, the mikes 500a and 500b detect a time difference between sounds recorded by the mikes 500a and 500b to identify a position of a sound source. Further, the lens unit 50 may be automatically oriented to the identified position of the sound source.

It should be noted that in the camera 200, although the mikes 500a and 500b are arranged in the space (hereinafter, referred to "the accommodating space") between the tilt shaft portion 40a and the panning base 312, other unit, modules, or devices may be arranged in the accommodating space. For example, a sound producing unit such as a buzzer and a speaker may be arranged in the accommodating space. In this case, for example, a sound producing function of producing an arbitral sound when an image similar to image data recorded in advance is found in a shot movie may be added. Moreover, a light-emitting device such as a light-emitting diode (LED) may be arranged in the accommodating space. Accordingly, an LED tag (visible light communication unit) can be added to the drone 10 on which the camera 200 is mounted. In this case, when the drone 10 flies in an arbitral airspace, the drone 10 receives light-emission information which can be received by only a drone having flight permission and causes the LED tag to emit light according to receipt of the light-emission information. As a result, it is possible to externally transmit that the drone 10 is a drone having flight permission. It should be noted that a location of the accommodating space is not limited to the space between the tilt shaft portion 40a and the panning base 312, but the accommodating space may be provided at an arbitral location unless the camera 100 (200) is increased in size.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-110103, filed Jun. 2, 2017 which is hereby incorporated by reference herein in its entirety.

What is claimed is:

1. An image pickup apparatus comprising:
   an image pickup unit that is rotatable about a shaft portion and that includes a rotational plate having a frictional sliding surface, the shaft portion being disposed along an axis of rotation of the image pickup unit; and
   an actuator including a vibrator including a contact point, a piezoelectric element that causes the vibrator to vibrate, and a pressure unit that presses the vibrator against the frictional sliding surface of the rotational plate in a pressure contact direction, thereby bringing the contact point of the vibrator into pressure contact with the frictional sliding surface of the rotational plate in the pressure contact direction,
   wherein the vibrator, when caused to vibrate by the piezoelectric element, causes the image pickup unit to rotate relative to the actuator by vibration of the contact point in pressure contact with the frictional sliding surface of the rotational plate, a direction of the rotation of the image pickup unit being different from the pressure contact direction.

2. The image pickup apparatus according to claim 1, further comprising:
   a base unit; and
   a supporting member that is provided in a standing manner from the base unit and that rotatably supports the image pickup unit,
   wherein the supporting member is comprised of a pair of arm portions,
   the image pickup unit is sandwiched and supported by the pair of arm portions,
   an opening that opens and faces the image pickup unit is provided in one of the pair of arm portions, and
   the actuator is arranged in the opening.

3. The image pickup apparatus according to claim 2, wherein the opening is formed in the one of the pair of arm portions between the base unit and a central axis of vertical rotation of the image pickup unit.

4. The image pickup apparatus according to claim 1, further comprising:
   a base unit;
   a supporting member that is provided in a standing manner from the base unit and that rotatably supports the image pickup unit; and
   a holding unit that holds the supporting member and that rotates on a rotational axis perpendicular to another rotational axis of the image pickup unit,
   wherein the actuator is accommodated in a region in which the holding unit rotates when viewed along the another rotational axis.

5. The image pickup apparatus according to claim 4,
   wherein the vibrator includes a plurality of contact points brought into pressure contact with the frictional sliding surface of the rotational plate, the plurality of contact points being comprised of a pair of protrusion portions, and
   the actuator is arranged so that a middle point of a virtual straight line obtained by connecting the pair of protrusion portions is positioned on a virtual plane defined by the rotational axis and the another rotational axis of the image pickup unit.

6. The image pickup apparatus according to claim 2, further comprising a position detecting unit that detects a rotational position of the image pickup unit,
wherein the position detecting unit has a light-emitting portion and a light-receiving portion,
the other of the pair of arm portions is provided with another opening,
the image pickup unit has a reflection portion arranged so as to face the another opening, and
the position detecting unit is arranged in the another opening so as to face the reflection portion.

7. The image pickup apparatus according to claim 6, wherein a distance from a rotation center of the image pickup unit to the contact point is equal to or less than a distance from the rotation center of the image pickup unit to a detecting point in which a rotational position is detected by the position detecting unit.

8. The image pickup apparatus according to claim 1, further comprising:
a base unit;
a supporting member that is provided in a standing manner from the base unit and that rotatably supports the image pickup unit; and
a holding unit that holds the supporting member and that rotates on a rotational axis perpendicular to another rotational axis of the image pickup unit,
wherein the supporting member has a defective portion formed by cutting out a part of the supporting member, and
the actuator is arranged in the defective portion and accommodated in a region in which the holding unit rotates when viewed along the another rotational axis.

9. A moving body comprising an image pickup apparatus,
wherein the image pickup apparatus has an image pickup unit that is rotatable about a shaft portion and that includes a rotational plate having a frictional sliding surface, the shaft portion being disposed along an axis of rotation of the image pickup unit, and an actuator including a vibrator including a contact point, a piezoelectric element that causes the vibrator to vibrate, and a pressure unit that presses the vibrator against the frictional sliding surface of the rotational plate in a pressure contact direction, thereby bringing the contact point of the vibrator into pressure contact with the frictional sliding surface of the rotational plate in the pressure contact direction,
wherein the vibrator, when caused to vibrate by the piezoelectric element, causes the image pickup unit to rotate relative to the actuator by vibration of the contact point in pressure contact with the frictional sliding surface of the rotational plate, a direction of the rotation of the image pickup unit being different from the pressure contact direction.

10. The moving body according to claim 9, further comprising a flying mechanism, wherein the moving body causes the image pickup apparatus to perform shooting while the moving body flies by the flying mechanism.

11. An image pickup apparatus comprising:
an image pickup unit that is rotatable about a shaft portion and that includes a rotational plate having a frictional sliding surface, the shaft portion being disposed along an axis of rotation of the image pickup unit; and
an actuator including a vibrator including a contact point, a piezoelectric element that causes the vibrator to vibrate, and a pressure unit that presses the vibrator against the frictional sliding surface of the rotational plate in a pressure contact direction, thereby bringing the contact point of the vibrator into pressure contact with the frictional sliding surface of the rotational plate in the pressure contact direction,
wherein the vibrator, when caused to vibrate by the piezoelectric element, causes the image pickup unit to rotate relative to the actuator by changing a position of the contact point on the frictional sliding surface, a direction of the rotation of the image pickup unit being different from the pressure contact direction.

12. The image pickup apparatus according to claim 11, further comprising a holding unit which holds the image pickup unit,
wherein the frictional sliding surface of the rotational plate is located on one side face of the holding unit.

13. The image pickup apparatus according to claim 12, further comprising:
a base unit; and
a supporting member that is provided in a standing manner from the base unit and that rotatably supports the holding unit,
wherein the supporting member is comprised of a pair of arm portions,
the holding unit is sandwiched and supported by the pair of arm portions,
an opening that opens and faces the holding unit is provided in one of the pair of arm portions, and
the actuator is arranged in the opening.

14. The image pickup apparatus according to claim 13,
wherein the vibrator includes a plurality of contact points brought into pressure contact with the frictional sliding surface of the rotational plate, the plurality of contact points being comprised of a pair of protrusion portions, and
the actuator is arranged so that a middle point of a virtual straight line obtained by connecting the pair of protrusion portions is positioned on a virtual plane defined by a rotational axis and another rotational axis of the image pickup unit.

15. The image pickup apparatus according to claim 13, further comprising a position detecting unit that detects a rotational position of the image pickup unit,
wherein the position detecting unit has a light-emitting portion and a light-receiving portion,
the other of the pair of arm portions is provided with another opening,
the image pickup unit has a reflection portion arranged so as to face the another opening, and
the position detecting unit is arranged in the another opening so as to face the reflection portion.

16. The image pickup apparatus according to claim 15, wherein a distance from a rotation center of the image pickup unit to the contact point is equal to or less than a distance from the rotation center of the image pickup unit to a detecting point in which a rotational position is detected by the position detecting unit.

17. The image pickup apparatus according to claim 11, further comprising:
a base unit;
a supporting member that is provided in a standing manner from the base unit and that rotatably supports the image pickup unit;
a holding unit that holds the supporting member and that rotates on a rotational axis perpendicular to another rotational axis of the image pickup unit, wherein the supporting member has a defective portion formed by cutting out a part of the supporting member, and the actuator is arranged in the defective portion and accommodated in a region in which the holding unit rotates when viewed along the another rotational axis.

18. A moving body comprising an image pickup apparatus, wherein the image pickup apparatus includes an image pickup unit that is rotatable about a shaft portion and that includes a rotational plate having a frictional sliding surface, the shaft portion being disposed along an axis of rotation of the image pickup unit, and an actuator including a vibrator including a contact point, a piezoelectric element that causes the vibrator to vibrate, and a pressure unit that presses the vibrator against the frictional sliding surface of the rotational plate in a pressure contact direction, thereby bringing the contact point of the vibrator into pressure contact with the frictional sliding surface of the rotational plate in the pressure contact direction, and wherein the vibrator, when caused to vibrate by the piezoelectric element, causes the image pickup unit to rotate relative to the actuator by changing a position of the contact point on the frictional sliding surface, a direction of the rotation of the image pickup unit being different from the pressure contact direction.

19. The moving body according to claim 18, further comprising a flying mechanism, wherein the moving body causes the image pickup apparatus to perform shooting while the moving body flies by the flying mechanism.

20. The image pickup apparatus according to claim 1, further comprising:

a base unit;

a supporting member that is provided in a standing manner from the base unit and rotatably supports the image pickup unit;

a holding unit that holds the supporting member and rotates on a rotational axis being different from another rotational axis of the image pickup unit; and a second actuator that causes the holding unit to rotate on the rotational axis, wherein the actuator is arranged between the another rotational axis and the base unit and causes the image pickup unit to rotate on the another rotational axis.

21. The moving body according to claim 20, further comprising a rotation plate fixed on the holding unit, wherein the second actuator includes a vibrator, which includes contact points brought into contact with the rotation plate, a piezoelectric element, and a pressure unit, the vibrator causing a relative movement of the rotation plate by driving of the piezoelectric element, the pressure unit pressing the vibrator against the rotation plate.

22. The image pickup apparatus according to claim 1, wherein the image pickup unit is rotatable about a first shaft portion and a second shaft portion such that the first shaft portion is disposed on a first side of the image pickup unit and the second shaft portion is disposed on a second side of the image pickup unit different from the first side of the image pickup unit, with the first shaft portion and the second shaft portion being disposed along the axis of rotation of the image pickup unit.

23. The image pickup apparatus according to claim 1, wherein the direction of the rotation is perpendicular to the pressure contact direction.

24. The image pickup apparatus according to claim 1, wherein the vibrator includes a plurality of the contact points in pressure contact with the frictional sliding surface of the rotational plate, and the vibrator, when caused to vibrate by the piezoelectric element, causes the image pickup unit to rotate relative to the actuator by vibration of the plurality of the contact points.

25. The image pickup apparatus according to claim 1, wherein a size of the piezoelectric element in a pressure applying direction of the pressure unit is smaller than a size of the piezoelectric element in another direction different from the pressure applying direction.

26. The image pickup apparatus according to claim 11, wherein the image pickup unit is rotatable about a first shaft portion and a second shaft portion such that the first shaft portion is disposed on a first side of the image pickup unit and the second shaft portion is disposed on a second side of the image pickup unit different from the first side of the image pickup unit, with the first shaft portion and the second shaft portion being disposed along the axis of rotation of the image pickup unit.

27. The image pickup apparatus according to claim 11, wherein the direction of the rotation is perpendicular to the pressure contact direction.

28. The image pickup apparatus according to claim 11, wherein the vibrator includes a plurality of the contact points in pressure contact with the frictional sliding surface of the rotational plate, and the vibrator, when caused to vibrate by the piezoelectric element, causes the image pickup unit to rotate relative to the actuator by vibration of the plurality of the contact points.

29. The image pickup apparatus according to claim 11, wherein a size of the piezoelectric element in a pressure applying direction of the pressure unit is smaller than a size of the piezoelectric element in another direction different from the pressure applying direction.

30. The image pickup apparatus according to claim 1, further comprising:

a base unit; and a pair of arm portions that are provided in a standing manner from the base unit and that rotatably support the image pickup unit, wherein the actuator is arranged on one arm of the pair of arm portions, wherein the actuator further includes a flexible printed circuit that applies a voltage to the piezoelectric element, and wherein the vibrator, when caused to vibrate by the piezoelectric element, causes the rotational plate to rotate about the shaft portion together with the image pickup unit by the vibration.

31. The image pickup apparatus according to claim 1, wherein the rotational plate is fixed to one side of the image pickup unit by a fixing member.

32. The image pickup apparatus according to claim 1, wherein the vibrator includes a plurality of contact points brought into pressure contact with the frictional sliding surface of the rotational plate, the plurality of contact points being comprised of a pair of protrusion portions.

* * * * *